Patented Oct. 31, 1922.

1,434,048

UNITED STATES PATENT OFFICE.

CHARLES DOERING AND HENRY H. DOERING, OF CHICAGO, ILLINOIS.

BUTTER SUBSTITUTE AND PROCESS OF MAKING SAME.

No Drawing.   Application filed November 6, 1920.   Serial No. 422,146.

*To all whom it may concern:*

Be it known that we, CHARLES DOERING and HENRY H. DOERING, citizens of the United States, and residents of Chicago, in the county of Cook and State of Illinois, have invented certain new and useful Improvements in Butter Substitutes and Processes of Making Same, of which the following is a description.

Our invention consists in a novel butter substitute or spread for bread, crackers, and the like; as well as in the process of manufacturing the same, whereby a palatable and nutritious product is provided.

The product or butter substitute consists of milk, vegetable oils or animal fats and salt manipulated or treated in the following manner.

The desired quantity of milk is heated in a suitable vessel to a temperature of approximately seventy degrees Fahrenheit until the milk is caused to thicken. This heated and thickened milk is then allowed to chill and is placed into a different vessel in which it is again heated to a temperature of approximately one hundred degrees Fahrenheit, after which the whey is drained therefrom, leaving the thickened portion or curd. To this thickened mass or curd and before the same is thoroughly chilled, we then add approximately three per cent of vegetable oil (such as cocoanut oil, peanut oil and the like) or animal fats, which has been previously heated to a temperature of approximately one hundred degrees Fahrenheit; salt, to the desired extent to suit taste, having been previously added to the oil or fats preferably before the latter have been added to the thickened mass or curd.

The mass consisting of the thickened milk or curd and oil or animal fat is then subjected to agitation or a working which is preferably accomplished by mechanical means of a character substantially similar to the combination working and blending machine or unit disclosed in our copending application, wherein the mass is fed from a hopper into cylindrical channels provided with rotating worm-screws disposed lengthwise of the channels, while at the delivery ends of the channel or channels are provided one or more foraminated plates; the worm-screw or screws and the foraminated plates causing the mass to be thoroughly worked and divided into small particles of vermicular form and then brought together into a compact mass containing the desired amount of moisture, as well as being more or less aerated thereby, with the result that the product will not only be thoroughly ripened, but at the same time possess a flavor substantially similar to that of creamery butter. The product is then ready for consumption and may be given any suitable form, being preferably passed through what is known as a print-forming machine whereby it is compressed into a mass of predetermined thickness and width permitting it to be cut into prints of desired size and weight.

Our improved product is not only adapted for use as a butter substitute, but may also be used in baking and frying in a manner similar to the usual use of butter; while our improved product can be manufactured and marketed at a very much less cost than is the case with the present type of butter substitutes; a product being provided which is not only cheap in manufacture, but which is especially adapted for use as a summer food; the finished product being of a creamy consistency, somewhat more so than the product known as cottage cheese.

What we claim and wish to secure by Letters Patent is:—

1. A product of the character described, consisting of heated milk from which the whey has been separated and approximately three per cent of salted and heated vegetable oil or animal fat.

2. A process substantially as described, which consists in subjecting milk to a temperature which will induce the same to thicken, allowing the same to cool, subjecting the same to an increased temperature, separating the whey therefrom and adding approximately three per cent of previously heated and salted vegetable oils or animal fats and then mechanically working said combined mass so as to cause a thorough blending of the ingredients.

3. A process of the character described, which consists in subjecting milk to a temperature of approximately 70 degrees which will induce it to thicken, allowing the same to chill, placing said thickened milk into a different vessel and heating the mass to approximately one hundred degrees Fahrenheit, separating the whey therefrom, heating vegetable oils or animal fats to a temperature of approximately one hundred degrees Fahrenheit, adding salt to said heated oils or fats and then mixing said previously heated salted oils or fats with said first mass before it is thoroughly chilled, said heated oil or fats constituting approximately three per cent of the entire mass, and then kneading and working the combined mass and forcing it through foraminated means to aerate the same and forcing the vermicular portions into a compact mass.

CHARLES DOERING.
HENRY H. DOERING.

Witnesses:
JOHN H. BAUMGARTNER,
B. AMONDSEN.